United States Patent
Li et al.

(10) Patent No.: US 11,183,917 B1
(45) Date of Patent: Nov. 23, 2021

(54) POWER CONVERTER, POWER CONVERSION SYSTEM, AND POWER CONVERSION METHOD

(71) Applicant: Contemporary Amperex Technology Co., Limited, Ningde (CN)

(72) Inventors: Meng Li, Ningde (CN); Zhimin Dan, Ningde (CN); Yizhen Hou, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 17/124,685

(22) Filed: Dec. 17, 2020

Related U.S. Application Data (63) Continuation of application No. PCT/CN2020/097624, filed on Jun. 23, 2020.

(51) Int. Cl.
| | |
|---|---|
| H02M 1/00 | (2006.01) |
| H02J 1/10 | (2006.01) |
| H02J 3/32 | (2006.01) |
| H02M 7/68 | (2006.01) |
| H02J 1/08 | (2006.01) |

(52) U.S. Cl.
CPC ........... *H02M 1/0006* (2021.05); *H02J 1/108* (2013.01); *H02J 3/322* (2020.01); *H02J 1/086* (2020.01); *H02M 7/68* (2013.01)

(58) Field of Classification Search
CPC ....... H02M 2001/0006; H02M 7/66–98; H02J 1/10–108; H02J 3/32–322; B60L 55/00
See application file for complete search history.

(56) References Cited

U.S. PATENT DOCUMENTS

| | | | |
|---|---|---|---|
| 9,413,271 B2 | 8/2016 | Vogel | |
| 2006/0226130 A1 | 10/2006 | Kooken et al. | |
| 2009/0236916 A1* | 9/2009 | Nishimura | H02J 3/383 307/80 |
| 2010/0039840 A1* | 2/2010 | Bahai | H02J 7/02 363/65 |

(Continued)

FOREIGN PATENT DOCUMENTS

| | | |
|---|---|---|
| CN | 108521163 A | 9/2018 |
| CN | 108899977 A | 11/2018 |

(Continued)

OTHER PUBLICATIONS

Extended European Search Report issued in European Application No. 20810848.0, dated Oct. 1, 2021, 7 pages.

*Primary Examiner* — Hal Kaplan
*Assistant Examiner* — David A Shiao
(74) *Attorney, Agent, or Firm* — Sterne, Kessler, Goldstein & Fox P.L.L.C.

(57) ABSTRACT

A power converter as provided includes: a control circuit configured to receive a first electric energy supplied to the control circuit from an energy storage device, receive a second electric energy supplied to the control circuit from a power grid equipment, and be powered on with a third electric energy which is the first electric energy or the second electric energy, and output a control signal; and a power conversion circuit configured to receive the control signal and perform power conversion between the energy storage device and the power grid equipment according to the control signal.

15 Claims, 3 Drawing Sheets

(56) References Cited

U.S. PATENT DOCUMENTS

| | | | |
|---|---|---|---|
| 2012/0068541 A1* | 3/2012 | Anderson | H02J 9/061 307/66 |
| 2012/0074777 A1* | 3/2012 | Sugiyama | B60L 50/51 307/22 |
| 2016/0079776 A1 | 3/2016 | Iguchi et al. | |
| 2018/0029545 A1* | 2/2018 | Mohrmann | H02J 1/108 |
| 2020/0172032 A1* | 6/2020 | Kawamura | H02J 7/34 |

FOREIGN PATENT DOCUMENTS

| | | | | |
|---|---|---|---|---|
| CN | 111200294 A | | 5/2020 | |
| CN | 210608927 U | | 5/2020 | |
| JP | 2003180085 A | * | 6/2003 | |
| JP | 2005295648 A | * | 10/2005 | |
| JP | 2012175801 A | * | 9/2012 | H02J 7/0031 |
| JP | 2014110665 A | * | 6/2014 | B60L 55/00 |

\* cited by examiner

POWER CONVERTER, POWER CONVERSION SYSTEM, AND POWER CONVERSION METHOD

CROSS-REFERENCE TO RELATED APPLICATIONS

This application is a continuation of International Application No. PCT/CN2020/097624, filed on Jun. 23, 2020, the disclosure of which is hereby incorporated into this disclosure by reference in its entirety.

TECHNICAL FIELD

The present disclosure relates to the technical field of electric circuits, and in particular, to a power converter, a power conversion system, and a power conversion method.

BACKGROUND

With the rapid development of electric vehicle technologies, the energy density of batteries is gradually improved, and vehicles can travel gradually increasing miles, and more and more electric vehicles can participate in the dispatch of a power grid as an energy storage system.

On one hand, when the electric vehicles participate in power grid dispatching, the electric energy of the power grid can be subjected to peak clipping and valley filling; on the other hand, by means of price difference subsidies to vehicle owners to reduce the cost of vehicle purchase, the electric vehicle's development can be promoted. Therefore, the electric vehicles participating in the dispatch of the power grid as an energy storage system can better protect the environment.

The electric vehicles, as energy storage devices, perform energy conversion with the power grid through a portable device serving as a power converter, and thus can participate in the dispatch of the power grid more conveniently.

SUMMARY

According to a first aspect of embodiments of the present disclosure, there is provided a power converter comprising: a control circuit configured to receive a first electric energy supplied to the control circuit from an energy storage device, receive a second electric energy supplied to the control circuit from a power grid equipment and be powered on with a third electric energy which is the first electric energy or the second electric energy, and output a control signal; and a power conversion circuit configured to: receive the control signal and perform power conversion between the energy storage device and the power grid equipment according to the control signal.

In some embodiments, the power converter further comprises: a first converter configured to down-convert a fourth electric energy input by the energy storage device into the first electric energy; and a second converter configured to down-convert a fifth electric energy input by the power grid equipment into the second electric energy.

In some embodiments, the control signal comprises a first control signal, and the power conversion circuit is configured to: convert the fourth electric energy into a sixth electric energy in response to the first control signal, wherein the fourth electric energy is direct current, and the sixth electric energy is alternating current and is configured to supply power to the power grid equipment or an electric equipment.

In some embodiments, the control circuit is further configured to: send a second control signal to the second converter after being powered on with the first electric energy; the second converter is further configured to: down-convert the sixth electric energy into a seventh electric energy in response to the second control signal, and supply power to the control circuit with the seventh electric energy.

In some embodiments, the control circuit is further configured to send a third control signal to the second converter after being powered on with the first electric energy or the seventh electric energy; the second converter is further configured to stop working in response to the third control signal.

In some embodiments, the control signal comprises a fourth control signal, and the power conversion circuit is configured to convert the fifth electrical energy into an eighth electrical energy in response to the fourth control signal, wherein the fifth electrical energy is alternating current, and the eighth electrical energy is direct current and configured to supply power to the energy storage device.

In some embodiments, the control circuit is further configured to send a fifth control signal to the first converter after being powered on with the second electric energy; the first converter is further configured to: down-convert the eighth electric energy into a ninth electric energy in response to the fifth control signal, and supply power to the control circuit with the ninth electric energy.

In some embodiments, the control circuit is further configured to send a sixth control signal to the first converter after being powered on with the second electric energy or the ninth electric energy; the first converter is further configured to stop working in response to the sixth control signal.

In some embodiments, the power converter further comprises a first diode, of which a positive pole is electrically connected with the first converter, and a negative pole is electrically connected with the control circuit, wherein the first converter is further configured to power the control circuit through the first diode; and a second diode, of which a positive pole is electrically connected with the second converter, and a negative pole is electrically connected with the negative pole of the first diode, wherein the second converter is further configured to power the control circuit through the second diode.

According to a second aspect of the embodiments of the present disclosure, there is provided a power conversion system comprising: the aforementioned power converter; a power grid equipment electrically connected with the power converter and configured to output or receive electric energy; and an energy storage device electrically connected with the power converter and configured to output or receive electric energy.

According to a third aspect of the embodiments of the present disclosure, there is provided a power conversion system comprising: the aforementioned power converter; the energy storage device electrically connected with the power converter and configured to output or receive electric energy; and an electric equipment electrically connected with the power converter and configured to receive electric energy.

According to a fourth aspect of the embodiments of the present disclosure, there is provided a power conversion method, comprising: receiving, by a control circuit, a first electric energy supplied to the control circuit from an energy storage device; receiving, by the control circuit, a second electric energy supplied to the control circuit from a power grid equipment; powering on the control circuit with a third electric energy and outputting a control signal, the third electric energy being the first electric energy or the second electric energy; and receiving, by the power conversion circuit, the control signal and performing power conversion between the energy storage device and the power grid equipment according to the control signal.

In some embodiments, the power conversion method further comprises: down-converting, by a first converter, a fourth electric energy input by the energy storage device into the first electric energy; and down-converting, by a second converter, a fifth electric energy input by the power grid equipment into the second electric energy.

In some embodiments, the control signal comprises a first control signal, and the performing power conversion between the energy storage device and the power grid equipment according to the control signal comprises: converting the fourth electric energy into a sixth electric energy in response to a first control signal, wherein the fourth electric energy is direct current, and the sixth electric energy is alternating current and configured to supply power to the power grid equipment or an electric equipment.

In some embodiments, the power conversion method further comprises: sending, by the control circuit, a second control signal to the second converter after being powered on with the first electric energy; and down-converting, by the second converter, the sixth electric energy into a seventh electric energy in response to the second control signal, and supplying power to the control circuit with the seventh electric energy.

In some embodiments, the power conversion method further comprises: sending, by the control circuit, a third control signal to the second converter after being powered on with the first electric energy or the seventh electric energy; and stopping the work of the second converter in response to the third control signal.

In some embodiments, the control signal comprises a fourth control signal, and the performing power conversion between the energy storage device and the power grid equipment according to the control signal comprises: converting the fifth electrical energy into an eighth electrical energy in response to the fourth control signal, wherein the fifth electrical energy is alternating current, and the eighth electrical energy is direct current and configured to supply power to the energy storage device.

In some embodiments, the power conversion method further comprises: sending, by the control circuit, a fifth control signal to the first converter after being powered on with the second electric energy; and down-converting, by the first converter, the eighth electric energy into a ninth electric energy in response to the fifth control signal, and supplying power to the control circuit with the ninth electric energy.

In some embodiments, the power conversion method further comprises: sending, by the control circuit, a sixth control signal to the first converter after being powered on with the second electric energy or the ninth electric energy; and stopping the work of the first converter in response to the sixth control signal.

In some embodiments, the power conversion method further comprises: powering the control circuit by the first converter through a first diode; and powering the control circuit by the second converter through a second diode.

Other features of the present disclosure and advantages thereof will become clear from the following detailed descriptions of the illustrative embodiments of the present disclosure with reference to accompanying drawings.

BRIEF DESCRIPTION OF THE DRAWINGS

In order to illustrate the technical solutions of the embodiments of the present disclosure or related art more clearly, a brief description will be given below for the drawings used in the description of the embodiments or technical solutions in the related art. The drawings illustrated as follows are merely some of the embodiments of the present disclosure. For one of ordinary skill in the art, he or she may also acquire other drawings according to such drawings without paying inventive efforts.

DETAILED DESCRIPTION

The technical solutions in the embodiments of the present disclosure will be clearly and completely described below with reference to the accompanying drawings in the embodiments of the present disclosure. The described embodiments are only a part of the embodiments of the present disclosure instead of all of them. The following descriptions on at least one illustrative embodiment are actually illustrative, but shall not set any limitation on the present disclosure and its application or utilization. All other embodiments that are obtainable to those skilled in the art based on the embodiments of the present disclosure without any creative effort are included in the protection scope of the present disclosure.

The electric vehicles, as energy storage devices, perform energy conversion with the power grid through a portable device serving as a power converter, and thus can participate in the dispatch of the power grid more conveniently. The electric vehicles can serve as energy storage devices, and can also release the electric vehicles' electric energy, and can provide the electric energy for electric equipment through a portable device serving as a power converter, so as to provide more convenient services for outdoor crowds, and embody the electric vehicles' value more sufficiently.

The inventors found through research that, if electricity is taken from a cigarette lighter port of the electric vehicle through a low-voltage power line, the power supply of the cigarette lighter port is a storage battery of the electric vehicle, and the storage battery is a low-voltage (12V-16V) battery and is generally located beside a driver seat. The energy storage device of the electric vehicle is a high-voltage power battery (as will be understood by those skilled in the art, the high-voltage power battery may be, for example, a lithium battery, etc.) of more than 60V, and is generally located below a chassis or a rear seat of the electric vehicle. Therefore, the cigarette lighter port of the electric vehicle is generally far away from a charging and discharging port of the energy storage device, and a long low-voltage power line needs to be led out to take electricity from the cigarette lighter port to the power converter so as to control energy conversion between the energy storage device and a power grid equipment or an electric equipment. This not only increases the complexity of using the power converter, but also has a risk of sudden power failure of the power converter due to manual misoperation during the charging and discharging, and thus reduces the reliability and safety of the electric vehicle during the electric energy transmission. In addition, if electricity is taken from the storage battery of the electric vehicle, it needs to consume the electric quantity of the storage battery, and even results in feed of the storage battery under the condition that the energy of the storage battery is insufficient, thereby seriously influencing the user's normal use. If the power converter is powered through a built-in storage battery inside the power converter, the power converter will be overlarge in size and inconvenient to carry. Moreover, due to the service life of the storage battery, if the storage battery is not replaced in time, the reliability and safety of the electric vehicle during the electric energy transmission will be reduced, and the manufacturing cost and maintenance cost of the power converter will be increased at the same time.

In view of this, the present disclosure provides a power converter to improve the reliability and safety of an electric vehicle during power transmission.

The present disclosure provides a portable device of a power converter. The power converter in the present disclosure can be powered on according to the electric energy provided by the power grid or the energy storage device, without the need of an extra power supply, thereby improving reliability and safety of the electric vehicles in the process of transmitting the electric energy by using the power converter.

Figure 1:
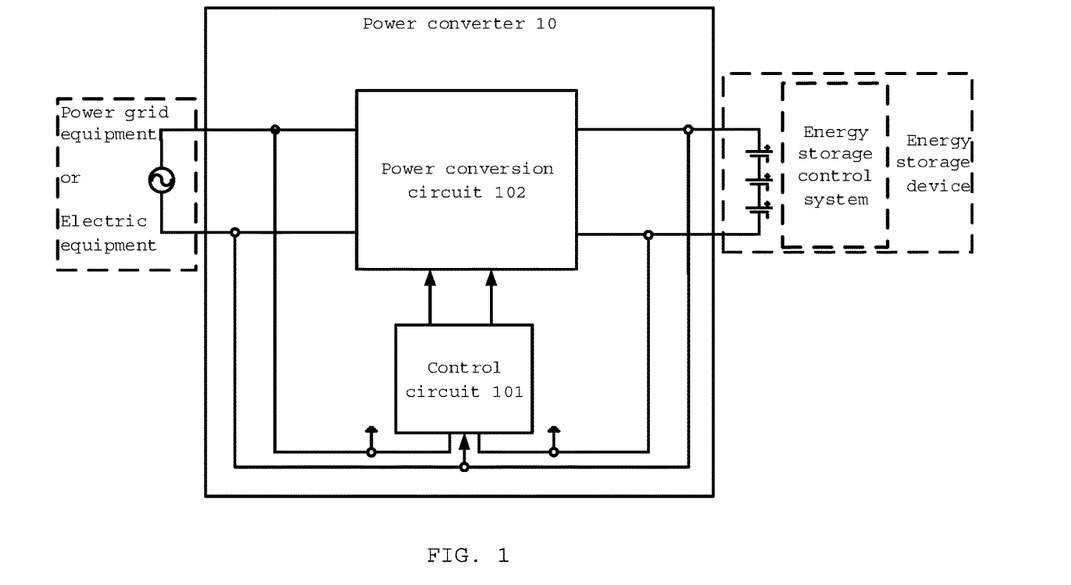
FIG. 1 illustrates a schematic structural diagram of a power converter according to some embodiments of the present disclosure.

Some embodiments of the power converter of the present disclosure are first described in conjunction with FIG. 1.

FIG. 1 illustrates a schematic structural diagram of a power converter according to some embodiments of the present disclosure. As shown in FIG. 1, one side of a power converter 10 is connected to a power grid equipment or an electric equipment, and the other side thereof is connected to an energy storage device located inside a vehicle, wherein the power converter 10 may be a portable power converter, and the power converter 10 itself does not carry electric energy. If one side of the power converter 10 is connected to the power grid equipment, an energy storage control system in the vehicle may consider that an initial state of the power grid equipment is high-voltage power by default, and control the power converter 10 to supply power to the energy storage device on the other side of the power converter 10. When the energy storage device is full of electric energy, the energy storage control system may also control the energy storage device to supply power to the power grid equipment through the power converter 10. Those skilled in the art would appreciate that, the energy storage control system may be a battery management system or a vehicle control system or the like. If one side of the power converter 10 is connected to the electric equipment, the energy storage control system or the control circuit of the power converter considers that the initial state of the energy storage device is high-voltage power by default, so as to supply power to the electric equipment on the other side of the power converter 10 through the power converter 10. A specific power conversion mode may be selected according to a policy of the energy storage control system, or may be selected according to a policy of the power converter. For example, a corresponding energy conversion mode may be selected according to an object to be charged, which is not specifically limited herein.

The power converter 10 may be located outside the vehicle as a portable device, comprising: a control circuit 101 and a power conversion circuit 102.

The control circuit 101 is configured to: receive a first electric energy supplied to the control circuit from an energy storage device; receive a second electric energy supplied to the control circuit from a power grid equipment; be powered on with a third electric energy which is the first electric energy or the second electric energy, and output a control signal. Those skilled in the art would appreciate that, the control circuit 101 specifically may be a single chip, a CPU, a control chip, etc. The energy storage control system and the control circuit 101 may communicate with each other through lines connecting the power converter 10 and the energy storage device, or wirelessly communicate, to transmit a control strategy of the energy storage control system to the control circuit 101. The control circuit 101 may output a corresponding control signal according to the control strategy of the energy storage control system, to control the power conversion circuit 102 to perform different power conversion modes.

The power conversion circuit configured to: receive the control signal and perform power conversion between the energy storage device and the power grid equipment according to the control signal. Those skilled in the art would appreciate that, the power conversion circuit 102 may be specifically a bidirectional DC/AC converter, and the power conversion circuit may comprise an AC (Alternating Current)/DC (Direct Current) converter and a DC/AC converter, to realize energy conversion between the energy storage device and the power grid, or to realize power supply to the electric equipment from the energy storage device.

In this embodiment, the power converter is a portable device, and can operate in different modes. In other words, by designing a portable power converter located outside the electric vehicle, the power grid equipment charges the energy storage device of the electric vehicle through the power converter, and the vehicle energy storage device can also supply power to the electric equipment or the power grid equipment through the power converter. In a mode that the power grid equipment supplies power to the energy storage device through the power converter, the power converter can take electricity from the power grid equipment; in a mode that the energy storage device feeds power to the power grid equipment through the power converter, the power converter can take electricity from the energy storage device; in a mode of power conversion between the power grid equipment and the energy storage device, the control circuit of the power converter can also select one of the power grid equipment and the energy storage device to take electricity. In a mode that the energy storage device supplies power to the electric equipment through the power converter, the power converter takes electricity from the energy storage device. By intelligently switching the power supply modes, the power converter does not need to take electricity from the cigarette lighting port, and does not need a built-in storage battery either, which solves the problems that the power converter is too large in size and weight and is not easy to carry, the problems that an electricity taking circuit is too long and easy to drop, and the problem that the built-in storage battery needs to be maintained frequently, thereby improving the reliability and safety of the power converter, and further improving the reliability and safety of the electric vehicle during the electric energy transmission.

Further embodiments of the power converter of the present disclosure are described below in conjunction with FIG. 2.

Figure 2:
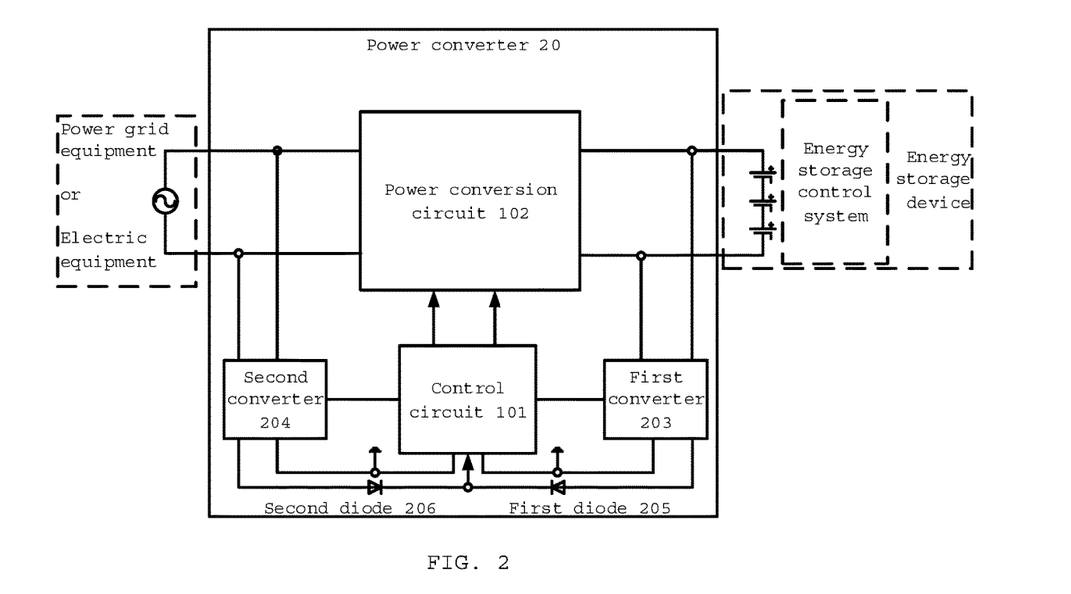
FIG. 2 illustrates a schematic structural diagram of a power converter according to further embodiments of the present disclosure.

FIG. 2 illustrates a schematic structural diagram of a power converter according to further embodiments of the present disclosure. As shown in FIG. 2, based on the embodiments corresponding to FIG. 1, the power converter 20 in these embodiments further comprises: a first converter 203 configured to down-convert a fourth electric energy input by the energy storage device into the first electric energy; and a second converter 204 configured to down-convert a fifth electric energy input by the power grid equipment into the second electric energy. Those skilled in the art would appreciate that, the first converter 203 and the second converter 204 may be down-converters.

In the case of DC to AC conversion, the control signal may comprise a first control signal. The power conversion circuit 102 is configured to: convert the fourth electric energy into a sixth electric energy in response to the first control signal, wherein the fourth electric energy is direct current, and the sixth electric energy is alternating current and configured to supply power to the power grid equipment or an electric equipment. The voltage of the sixth electric energy may be controlled according to the first control signal, so that the voltage of the sixth electric energy when supplying power to the power grid equipment is greater than that when supplying power to the electric equipment.

In the case of AC to DC conversion, the control signal may also comprise a fourth control signal. The power conversion circuit 102 is further configured to: convert the fifth electrical energy into an eighth electrical energy in response to the fourth control signal, wherein the fifth electrical energy is alternating current, and the eighth electrical energy is direct current and configured to supply power to the energy storage device.

In some embodiments, the control circuit 101 is further configured to: send a second control signal to the second converter 204 after being powered on with the first electric energy; and send a fifth control signal to the first converter 203 after being powered on with the second electric energy. The second converter 204 is further configured to: down-convert the sixth electric energy into a seventh electric energy in response to the second control signal, and supply power to the control circuit 101 with the seventh electric energy; and down-convert the eighth electric energy into a ninth electric energy in response to the fifth control signal, and supply power to the control circuit 101 with the ninth electric energy.

Specifically, if the energy storage device drives the first converter 203 to work first and supply power to the control circuit 101, the control circuit 101 controls the power conversion circuit 102 to work after being powered on, and the second converter 204 is also in a working state after taking electricity from the power conversion circuit 102, and finally the first converter 203 and the second converter 204 supply power to the control circuit 101 competitively. If the power grid equipment drives the second converter 204 to work first and supply power to the control circuit 101, the control circuit 101 controls the power conversion circuit 102 to work after being powered on, and the first converter 203 is also in a working state after taking electricity from the power conversion circuit 102, and finally the first converter 203 and the second converter 204 supply power to the control circuit 101 competitively.

In these embodiments, the two converters supply power to the control circuit competitively, and the control circuit may select one of the two converters as a power supply. A specific selection policy may be to select one of the two power supplies with a higher voltage as the power supply, or may be a policy of another form, which is not specifically limited herein. When one converter fails to supply power, the other converter can normally supply power to the control circuit, to further ensure reliability of the electric vehicle during the electric energy transmission and provide more sufficient power supply guarantee for the control circuit.

In some embodiments, the control circuit 101 is further configured to: send a third control signal to the second converter 202 after being powered on with the first electric energy or the seventh electric energy; send a sixth control signal to the first converter 203 after being powered on with the second electric energy or the ninth electric energy. The second converter is further configured to: stop working in response to the third control signal; and stop working in response to the sixth control signal. The control circuit 101 is further configured to, when receiving simultaneously power from the first converter and the second converter, after being powered on with the power output by one of the converters, control the other converter to stop working.

Specifically, if the energy storage device drives the first converter 203 to work and supply power to the control circuit 101, the control circuit 101 may control the power conversion circuit 102 to work after being powered on, and the control circuit may select to make the second converter 204 in a non-working state. If the power grid equipment drives the second converter 204 to work and supplies power to the control circuit 101, the control circuit 101 controls the power conversion circuit 102 to work after being powered on, and may select to make the first converter 203 in a non-working state. Those skilled in the art would appreciate that, the control circuit 101 may select one of the converters to supply power and control the other converter to stop working, according to its own strategy or a control strategy of the energy storage control system.

In these embodiments, after the control circuit is powered on, power is supplied only by one converter, which can save energy consumption, and can avoid frequently switching the two converters when they compete for the power supply.

In some embodiments, the power converter further comprises a first diode 205 and a second diode 206, wherein a positive pole of the first diode 205 is electrically connected with the first converter 203, a negative pole of the first diode 205 is electrically connected with the control circuit 101, a positive pole of the second diode 206 is electrically connected with the second converter 204, and a negative pole of the second diode 206 is electrically connected with the negative pole of the first diode 205. The first converter 203 is further configured to power the control circuit 101 through the first diode 205; and the second converter 204 is further configured to power the control circuit 101 through the second diode 206.

Since the second diode can prevent the output of the first converter from affecting the second converter, and the first diode can prevent the output of the second converter from affecting the first converter, these embodiments can improve the reliability and safety of the power converter.

Some embodiments of the power conversion system of the present disclosure are described below in conjunction with FIG. 3.

Figure 3:
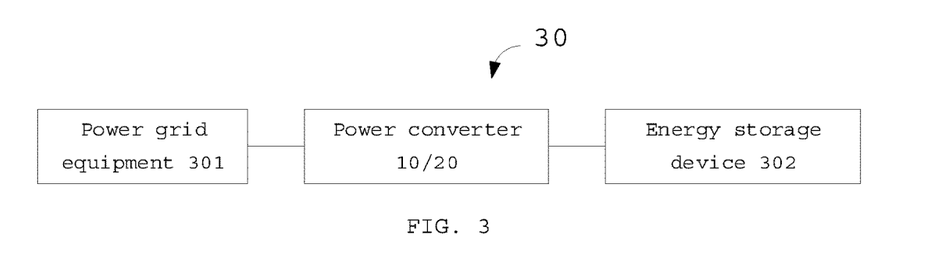
FIG. 3 illustrates a schematic structural diagram of a power conversion system according to some embodiments of the present disclosure.

FIG. 3 illustrates a schematic structural diagram of a power conversion system according to some embodiments of the present disclosure. As shown in FIG. 3, the power conversion system 30 comprises: the aforementioned power converter 10 or 20 located outside a vehicle; a power grid equipment 301 electrically connected with the power converter 10 or 20, and configured to output a fifth electric energy or receive a sixth electric energy; an energy storage device 302 located inside the vehicle, electrically connected with the power converter 10 or 20, and configured to output a fourth electric energy or receive an eighth electric energy. It should be understood by those skilled in the art that the energy storage device is a power battery of the electric vehicle, and specifically may be a high-voltage power battery such as a lithium battery.

In a mode that the power grid equipment supplies power to the energy storage device through the power converter, the power converter takes electricity from the power grid equipment, which improves the reliability and safety of the power converter, and further improves the reliability and safety of the electric vehicle during the electric energy transmission.

Further embodiments of the power conversion system of the present disclosure are described below in conjunction with FIG. 4.

Figure 4:
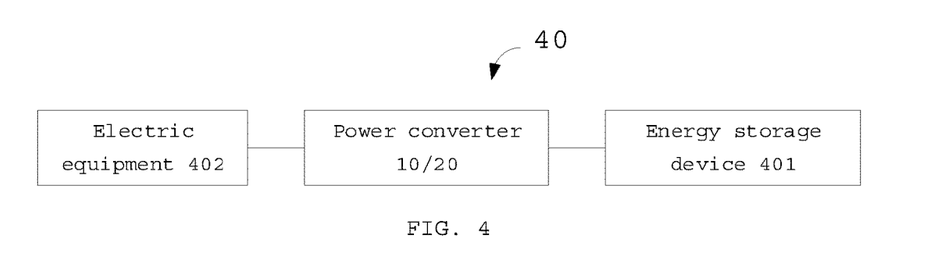
FIG. 4 illustrates a schematic structural diagram of a power conversion system according to further embodiments of the present disclosure.

FIG. 4 illustrates a schematic structural diagram of a power conversion system according to further embodiments of the present disclosure. As shown in FIG. 4, the power conversion system 40 comprises: the aforementioned power converter 10 or 20 located outside a vehicle; an energy storage device 401 located inside the vehicle, electrically connected with the power converter, and configured to output a fourth electric energy or receive an eighth power; an electric equipment 402, electrically connected with the power converter 10 or 20, and configured to receive a sixth electric energy.

In a mode that the energy storage device supplies power to the electric equipment through the power converter, the power converter takes electricity from the energy storage device, which improves the reliability and safety of the power converter, and further improves the reliability and safety of the electric vehicle during the electric energy transmission.

Some embodiments of a power conversion method of the present disclosure are described below in conjunction with FIG. 5.

Figure 5:
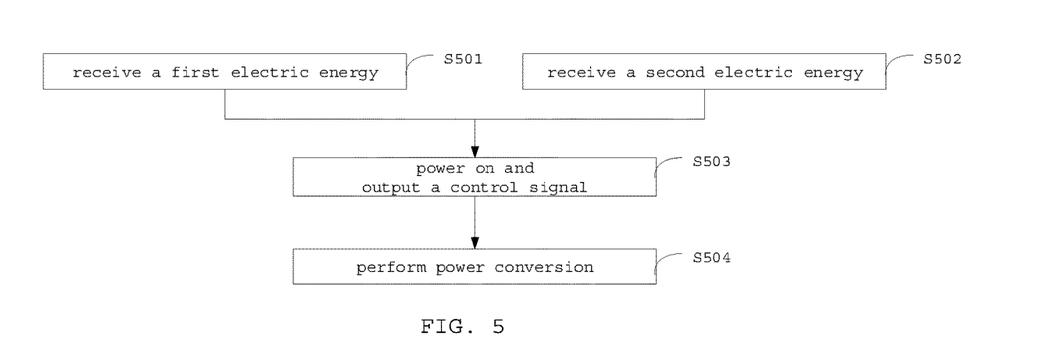
FIG. 5 illustrates a flow diagram of a power conversion method according to some embodiments of the present disclosure.

FIG. 5 illustrates a flow diagram of a power conversion method according to some embodiments of the present disclosure. As shown in FIG. 5, the present embodiment comprises steps S501 to S504.

In step S501, a control circuit receives a first electric energy supplied from an energy storage device to the control circuit.

In step S502, the control circuit receives a second electric energy supplied from the power grid equipment to the control circuit.

Those skilled in the art would appreciate that, the order of executing the step S501 and step S502 may be interchanged, and is not limited herein. In step S503, the control circuit powers on with a third electric energy which is the first electric energy or the second electric energy and outputs a control signal.

In step S504, the power conversion circuit receives the control signal, and performs power conversion between the energy storage device and the power grid equipment according to the control signal.

The selection of the third electric energy may be decided according to a control strategy of the control circuit. Specifically, the control circuit may select any one of the first electric energy and the second electric energy, or select one of the first electric energy and the second electric energy with a larger voltage, or select one end with a relatively sufficient electric quantity to supply power, or other strategies, which are not limited specifically.

In these embodiments, by intelligently switching the power supply modes during the working of the power converter, the power converter does not need to take electricity from the cigarette lighting port, and does not need a built-in storage battery either, which solves the problems that the power converter is too large in size and weight and is not easy to carry, the problems that an electricity taking circuit is too long and easy to drop, and the problem that the built-in storage battery needs to be maintained frequently, thereby improving the reliability and safety of the power converter, and further improving the reliability and safety of the electric vehicle during the electric energy transmission.

Further embodiments of the power conversion method of the present disclosure are described below in conjunction with FIG. 6.

Figure 6:
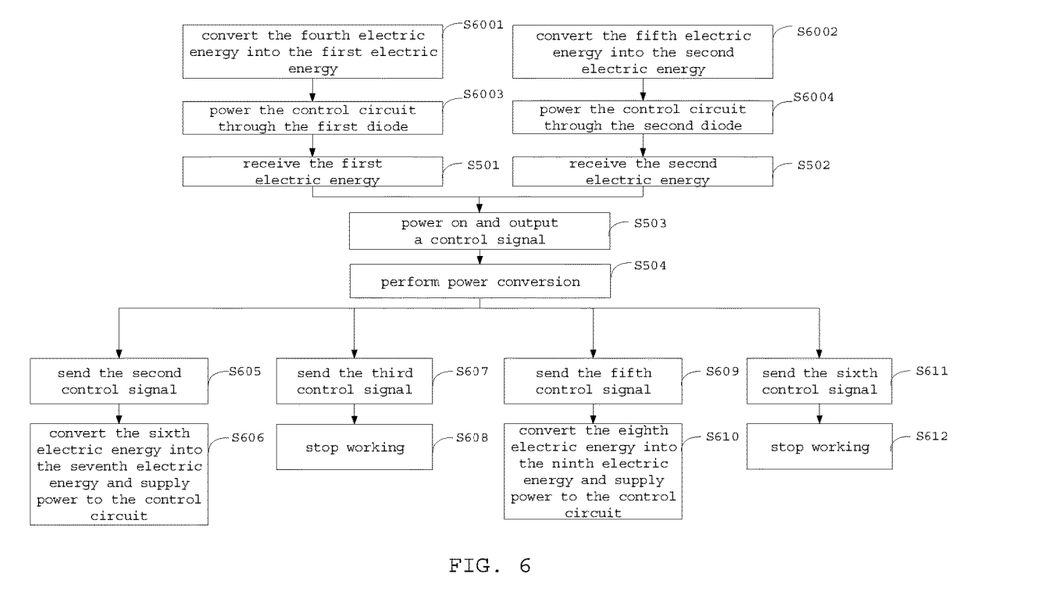
FIG. 6 illustrates a flow diagram of a power conversion method according to further embodiments of the present disclosure.

FIG. 6 illustrates a flow diagram of a power conversion method according to further embodiments of the present disclosure. As shown in FIG. 6, the present embodiment further comprises steps S6001 to S6002.

In step S6001, the first converter down-converts a fourth electric energy input by the energy storage device into the first electric energy.

In step S6002, the second converter down-converts a fifth electric energy input by the power grid equipment into the second electric energy.

Those skilled in the art would appreciate that, the order of executing the step S6001 and step S6002 may be interchanged, and is not limited herein.

In the case of a DC to AC conversion, the control signal may particularly comprise a first control signal. Accordingly, in step S504, the power conversion circuit may convert the fourth electric energy into a sixth electric energy in response to the first control signal, wherein the fourth electric energy is direct current, and the sixth electric energy is alternating current and configured to supply power to the power grid equipment or an electric equipment.

In the case of AC to DC conversion, the control signal may particularly comprise a fourth control signal. Accordingly, in step S504, the power conversion circuit may convert the fifth electric energy into an eighth power in response to the fourth control signal, wherein the fifth electric energy is alternating current, and the eighth electric energy is direct current and configured to supply power to the energy storage device.

In some embodiments, the power conversion method further comprises steps S605 to S606. In step S605, the control circuit sends a second control signal to the second converter after being powered on with the first electric energy. In step S606, the second converter down-converts the sixth electric energy into a seventh electric energy in response to the second control signal, and supplies power to the control circuit with the seventh electric energy.

In these embodiments, the two converters supply power to the control circuit competitively, and the control circuit may select one of the two converters as a power supply. A specific selection policy may be to select one of the two power supplies with a higher voltage as the power supply, or may be a policy of another form, which is not specifically limited herein. When one converter fails to supply power, the other converter can normally supply power to the control circuit, to further ensure reliability of the electric vehicle during the electric energy transmission and provide more sufficient power supply guarantee for the control circuit.

In some embodiments, the power conversion method further comprises steps S607-S608. In step S607, the control circuit sends a third control signal to the second converter after being powered on with the first electric energy or the seventh electric energy. In step S608, the second inverter stops working in response to the third control signal.

In these embodiments, after the control circuit is powered on, power is supplied only by one converter, which can save energy consumption, and can avoid frequently switching the two converters when they compete for power supply.

In some embodiments, the power conversion method further comprises steps S609 to S610. In step S609, the control circuit sends a fifth control signal to the first converter after being powered on with the second electric energy In step S610, the first converter down-converts the eighth electric energy into a ninth electric energy in response to the fifth control signal, and supplies power to the control circuit with the ninth electric energy.

In these embodiments, the two converters supply power to the control circuit competitively, and the control circuit may select one of the two converters as a power supply. A specific selection policy may be to select one of the two power supplies with a higher voltage as the power supply, or may be a policy of another form, which is not specifically limited herein. When one converter fails to supply power, the other converter can normally supply power to the control circuit, to further ensure reliability of the electric vehicle during the electric energy transmission and provide more sufficient power supply guarantee for the control circuit.

In some embodiments, the power conversion method further comprises steps S611 to S612. In step S611, the control circuit sends a sixth control signal to the first converter after being powered on with the second electric energy or the ninth electric energy. In step S612, the first converter stops working in response to the sixth control signal.

In these embodiments, after the control circuit is powered on, power is supplied only by one converter, which can save energy consumption, and can avoid frequently switching the two converters when they compete for power supply.

In some embodiments, the power conversion method further comprises steps S6003 to S6004. In step S6003, the first converter supplies power to the control circuit through a first diode. In step S6004, the second converter supplies power to the control circuit through a second diode.

Since the second diode can prevent the output of the first converter from affecting the second converter, and the first diode can prevent the output of the second converter from affecting the first converter, these embodiments can improve the reliability and safety of the power converter.

The present disclosure is described with reference to the flow charts and/or block diagrams of the method, device (system) and computer program product according to the embodiments of the present disclosure. It shall be understood that each flow and/or block in the flowcharts and/or block diagrams and a combination of the flows and/or blocks in the flowcharts and/or block diagrams can be implemented by computer program instructions. These computer program instructions can be provided to a general purpose computer, a special purpose computer, an embedded processor, or a processor of other programmable data processing devices so as to generate a machine for generating means for implementing the functions of one or more flows of a flowchart and/or one or more blocks of a block diagram by using the instructions executed by the computer or the processor of other programmable data processing devices.

These computer program instructions can also be stored in a computer readable memory guiding the computer or other programmable data processing devices to work in a particular way, such that the instructions stored in the computer readable memory generate an article of manufacture containing instruction means which implement the functions of one or more flows of a flowchart and/or one or more blocks in a block diagram.

These computer program instructions can also be loaded onto a computer or other programmable data processing devices such that a series of operational steps are performed on a computer or other programmable devices to produce computer-implemented processing, so that the instructions executed on a computer or other programmable devices provide steps for implementing the functions of one or more flows of a flowchart and/or one or more blocks of a block diagram.

The above content is only preferred embodiments of this disclosure, but cannot be used for limiting this disclosure. Any modification, equivalent replacement and improvement, etc. within the spirit and principle of this disclosure shall be contained in the scope of protection of this disclosure.

What is claimed is:

1. A power converter, wherein one side of the power converter is connected to a power grid equipment, the other side of the power converter is connected to an energy storage device located inside a vehicle, and the power grid equipment supplies power to the energy storage device through the power converter, the power converter comprising:
    a control circuit;
    a power conversion circuit;
    a first converter; and
    a second converter,
wherein:
    the control circuit is configured to:
        receive a second electric energy supplied to the control circuit from the power grid equipment through the second converter, and
        output a fourth control signal to control the power conversion circuit to work after being powered on;
    the power conversion circuit is configured to receive the fourth control signal and perform power conversion between the energy storage device and the power grid equipment according to the fourth control signal;
    the first converter is configured to be in a working state after taking electricity from the power conversion circuit, down-convert an electric energy output from the power conversion circuit into a ninth electric energy in response to a fifth control signal, and supply power to the control circuit with the ninth electric energy; and
    the control circuit is further configured to select the second electrical energy or the ninth electrical energy as the power supply of the control circuit based on a competitive power supply mode.

2. The power converter according to claim 1, wherein the second converter is configured to down-convert a fifth electric energy input by the power grid equipment into the second electric energy.

3. The power converter according to claim 2, wherein the power conversion circuit is further configured to convert the fifth electrical energy into an eighth electrical energy in response to the fourth control signal, wherein the fifth electrical energy is alternating current, and the eighth electrical energy is direct current and configured to supply power to the energy storage device.

4. The power converter according to claim 3, wherein the control circuit is further configured to send the fifth control signal to the first converter after being powered on with the second electric energy.

5. The power converter according to claim 4, wherein:
the control circuit is further configured to send a sixth control signal to the first converter after being powered on with the second electric energy or the ninth electric energy; and
the first converter is further configured to stop working in response to the sixth control signal.

6. The power converter according to claim 1, further comprising:
a first diode, of which a positive pole is electrically connected with the first converter, and a negative pole is electrically connected with the control circuit, wherein the first converter is further configured to power the control circuit through the first diode; and
a second diode, of which a positive pole is electrically connected with the second converter, and a negative pole is electrically connected with the negative pole of the first diode, wherein the second converter is further configured to power the control circuit through the second diode.

7. A power conversion system comprising:
the power converter according to claim 1;
the power grid equipment electrically connected with the power converter and configured to output electric energy; and
the energy storage device electrically connected with the power converter and configured to output electric energy.

8. The power converter according to claim 1, wherein:
the control circuit is further configured to select one of the second electrical energy and the ninth electrical energy with a higher voltage as the power supply of the control circuit.

9. A power conversion method, comprising:
receiving, by a control circuit, a second electric energy supplied to the control circuit from a power grid equipment through a second converter;
outputting, by the control circuit, a fourth control signal to control a power conversion circuit connected between an energy storage device and the power grid equipment to work after being powered on;
receiving, by the power conversion circuit, the fourth control signal and performing power conversion between the energy storage device and the power grid equipment according to the fourth control signal;
being, by a first converter, in a working state after taking electricity from the power conversion circuit, down-converting an electric energy output from the power conversion circuit into a ninth electric energy in response to a fifth control signal output from the control circuit, and supplying power to the control circuit with the ninth electric energy; and
selecting, by the control circuit, the second electrical energy or the ninth electrical energy as the power supply of the control circuit based on a competitive power supply mode.

10. The power conversion method according to claim 9, further comprising:
down-converting, by the second converter, a fifth electric energy input by the power grid equipment into the second electric energy.

11. The power conversion method according to claim 10, wherein the performing power conversion between the energy storage device and the power grid equipment according to the fourth control signal comprises: converting the fifth electrical energy into an eighth electrical energy in response to the fourth control signal, wherein the fifth electrical energy is alternating current, and the eighth electrical energy is direct current and configured to supply power to the energy storage device.

12. The power conversion method according to claim 11, further comprising:
sending, by the control circuit, the fifth control signal to the first converter after being powered on with the second electric energy.

13. The power conversion method according to claim 12, further comprising:
sending, by the control circuit, a sixth control signal to the first converter after being powered on with the second electric energy or the ninth electric energy; and
stopping the work of the first converter in response to the sixth control signal.

14. The power conversion method according to claim 9, further comprising:
powering the control circuit by the first converter through a first diode; and
powering the control circuit by the second converter through a second diode.

15. The power conversion method according to claim 9, wherein the selecting, by the control circuit, the second electrical energy or the ninth electrical energy as the power supply of the control circuit based on a competitive power supply mode comprises:
selecting, by the control circuit, one of the second electrical energy and the ninth electrical energy with a higher voltage as the power supply of the control circuit.

* * * * *